United States Patent
Long et al.

(10) Patent No.: US 11,455,765 B2
(45) Date of Patent: Sep. 27, 2022

(54) METHOD AND APPARATUS FOR GENERATING VIRTUAL AVATAR

(71) Applicant: Beijing Baidu Netcom Science and Technology Co., Ltd., Beijing (CN)

(72) Inventors: Xiang Long, Beijing (CN); Xin Li, Beijing (CN); Henan Zhang, Beijing (CN); Hao Sun, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 17/182,604

(22) Filed: Feb. 23, 2021

(65) Prior Publication Data

US 2021/0279934 A1 Sep. 9, 2021

(30) Foreign Application Priority Data

Mar. 9, 2020 (CN) .......................... 202010156571.X

(51) Int. Cl.
*G06T 13/40* (2011.01)
*G06T 19/20* (2011.01)
*G06N 3/04* (2006.01)

(52) U.S. Cl.
CPC ........... *G06T 13/40* (2013.01); *G06N 3/0454* (2013.01); *G06T 19/20* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 2012/0130717 A1 | 5/2012 | Xu et al. | |
| 2013/0235045 A1 | 9/2013 | Corazza et al. | |
| 2016/0148041 A1 | 5/2016 | Kim et al. | |
| 2018/0336714 A1 | 11/2018 | Stoyles et al. | |
| 2019/0266775 A1 | 8/2019 | Lee et al. | |
| 2020/0202603 A1* | 6/2020 | Choi | G06T 11/60 |

FOREIGN PATENT DOCUMENTS

| | | |
|---|---|---|
| CN | 109978996 A | 7/2019 |
| CN | 110288680 A | 9/2019 |

OTHER PUBLICATIONS

Tripathy, Soumya, Juho Kannala, and Esa Rahtu. "Icface: Interpretable and controllable face reenactment using gans." Proceedings of the IEEE/CVF Winter Conference on Applications of Computer Vision. 2020. (Year: 2020).*

(Continued)

*Primary Examiner* — Vu Nguyen
(74) *Attorney, Agent, or Firm* — Kilpatrick Townsend & Stockton LLP

(57) ABSTRACT

A method and apparatus for generating a virtual avatar are provided. The method may include: acquiring a first avatar, and determining an expression parameter of the first avatar, where the expression parameter of the first avatar including an expression parameter of at least one of five sense organs; and determining, based on the expression parameter of at least one of the five sense organs, a target virtual avatar that is associated with an attribute of the first avatar and has an expression of the first avatar.

16 Claims, 5 Drawing Sheets

(56) References Cited

OTHER PUBLICATIONS

Tripathy, Soumya et al., "ICface: Interpretable and Controllable Face Reenactment Using GANs," 2020 IEEE Winter Conference on Applications of Computer Vision (WACV), IEEE, pp. 3374-3383, (Mar. 1, 2020).
Onizuka, Hayato et al., "Landmark-guided deformation transfer of template facial expressions for automatic generation of avatar Bblendshapes," 2019 IEEE/CVF International Conference on Computer Vision Workshop (ICCVW), IEEE, pp. 2100-2108, (Oct. 27, 2019).
Aneja, Deepali, et al., "A High-Fidelity Open Embodied Avatar with Lip Syncing and Expression Capabilities," ARXIV.org, Cornell University Library, 201 Olin Library, Cornell University Ithaca, NY 14853, (Sep. 19, 2019).
European Search Report dated Nov. 23, 2021 of corresponding European Patent Application No. 21155927.3 (20 pages).
Ichim, Alexandru Eugen, et al., "Dynamic 3D avatar creation from hand-held video input," ACM Transaction on Graphics, vol. 34, Issue 4, https://doi.org/10.1145/2766974, pp. 1-17, (Jul. 27, 2015).
Okada, Tomoko et al., "Pose Robust and Person Independent Facial Expressions Recognition using AAM of Model Selection," Graduate School of Engineering, Kobe University, Organization of Advanced Science and Technology, one page, 2009 IEEE 13th International Symposium on Consumer Electronics, (May 25, 2009).

\* cited by examiner

METHOD AND APPARATUS FOR GENERATING VIRTUAL AVATAR

CROSS-REFERENCE TO RELATED APPLICATIONS

This application claims priority to Chinese Application No. 202010156571.X, filed on Mar. 9, 2020 and entitled "Method and Apparatus for Generating Virtual Avatar," the content of which is hereby incorporated by reference in its entirety.

TECHNICAL FIELD

Embodiments of the present disclosure relate to the field of computer technology, specifically to the field of Internet technology, and more specifically to a method and apparatus for generating a virtual avatar.

BACKGROUND

With the development of Internet technology, more and more live broadcast platforms and short video platforms emerge. A user can upload a video shot by himself via a mobile phone or the like. In a scenario such as selfie or live broadcast, an electronic device can map facial features and expressions of the user to two-dimensional or three-dimensional animated images, thereby effectively enhancing the interest and richness of pictures.

In the related art, the above-mentioned mapping generally maps the facial features and expressions of the user to fixed animated images. When generating an animation similar to a real person, a long time is often required.

SUMMARY

Embodiments of the present disclosure propose a method and apparatus for generating a virtual avatar.

In a first aspect, an embodiment of the present disclosure provides a method for generating a virtual avatar, the method including: acquiring a first avatar, and determining an expression parameter of the first avatar, the expression parameter of the first avatar including an expression parameter of at least one of five sense organs; and determining, based on the expression parameter of at least one of the five sense organs, a target virtual avatar that is associated with an attribute of the first avatar and has an expression of the first avatar.

In some embodiments, the method further includes: generating an expressionless reference virtual avatar associated with the attribute of the first avatar; and the determining, based on the expression parameter of at least one of the five sense organs, the target virtual avatar that is associated with the attribute of the first avatar and has the expression of the first avatar includes: inputting the reference virtual avatar and the expression parameter of at least one of the five sense organs into a pre-trained deep neural network to obtain a first virtual avatar that is associated with the attribute of the first avatar and has the expression of the first avatar; and generating, based on the first virtual avatar, the target virtual avatar.

In some embodiments, the inputting the reference virtual avatar and the expression parameter of at least one of the five sense organs into the pre-trained deep neural network to obtain the first virtual avatar that is associated with the attribute of the first avatar and has the expression of the first avatar includes: inputting the reference virtual avatar and the expression parameter of at least one of five sense organs into a pre-trained first generative adversarial network to obtain the first virtual avatar that is outputted from the first generative adversarial network, and is associated with the attribute of the first avatar and has the expression of the first avatar.

In some embodiments, the expression parameter of the first avatar further includes a head angle; and the generating, based on the first virtual avatar, the target virtual avatar includes: inputting the first virtual avatar and the head angle into a second pre-trained generative adversarial network to obtain the target virtual avatar that is outputted from the second generative adversarial network, and is associated with the attribute of the first avatar and has the expression and head angle of the first avatar.

In some embodiments, the expression parameter of at least one of the five sense organs includes an eye parameter and a mouth parameter; and the determining the expression parameter of the first avatar includes: detecting expression-related key points of the first avatar to obtain detection results, wherein the expression-related key points include eye key points and mouth key points; and determining, based on the detection results, the eye parameter, the mouth parameter and the head angle of the first avatar.

In some embodiments, the generating the expressionless reference virtual avatar associated with the attribute of the first avatar includes: inputting the first avatar into a pre-trained third generative adversarial network to obtain the expressionless reference virtual avatar that is outputted from the third generative adversarial network and associated with the attribute of the first avatar; or detecting the attribute of the first avatar, determining an expressionless virtual avatar associated with the detected attribute based on a preset three-dimensional avatar model, and using the virtual avatar as the expressionless reference virtual avatar associated with the attribute of the first avatar.

In some embodiments, the determining, based on the expression parameter of at least one of the five sense organs, the target virtual avatar that is associated with the attribute of the first avatar and has the expression of the first avatar includes: selecting, among preset expression parameters, a preset expression parameter with a smallest difference from the expression parameter of the first avatar; acquiring a preset virtual avatar that is associated with the attribute of the first avatar and has an expression corresponding to the selected preset expression parameter; and generating, based on the preset virtual avatar, the target virtual avatar.

In some embodiments, the expression parameter of the first avatar further includes a head angle; and the generating, based on the preset virtual avatar, the target virtual avatar includes: inputting a difference between the expression parameter of the first avatar and the selected preset expression parameter, and the preset virtual avatar into a pre-trained fourth generative adversarial network to obtain the target virtual avatar that is outputted from the fourth generative adversarial network, and is associated with the attribute of the first avatar and has the expression and head angle of the first avatar, wherein a number of parameters of the fourth generative adversarial network is smaller than a number of parameters of the first generative adversarial network and smaller than a number of parameters of the second generative adversarial network.

In some embodiments, the acquiring the first avatar includes: acquiring a to-be-processed avatar; and correcting the to-be-processed avatar to obtain a front avatar of the to-be-processed avatar, and using the front avatar as the first avatar.

In some embodiments, the method further includes: determining an expression category corresponding to the first avatar; and adding a special effect corresponding to the expression category to the target virtual avatar.

In a second aspect, an embodiment of the present disclosure provides an apparatus for generating a virtual avatar, the apparatus including: an acquisition unit, configured to acquire a first avatar, and determine an expression parameter of the first avatar, the expression parameter of the first avatar including an expression parameter of at least one of five sense organs; and a determination unit, configured to determine, based on the expression parameter of at least one of the five sense organs, a target virtual avatar that is associated with an attribute of the first avatar and has an expression of the first avatar.

In some embodiments, the apparatus further includes: a generation unit, configured to generate an expressionless reference virtual avatar associated with the attribute of the first avatar; and the determination unit is further configured to determine, based on the expression parameter of at least one of the five sense organs, the target virtual avatar that is associated with the attribute of the first avatar and has the expression of the first avatar by: inputting the reference virtual avatar and the expression parameter of at least one of the five sense organs into a pre-trained deep neural network to obtain a first virtual avatar that is associated with the attribute of the first avatar and has the expression of the first avatar; and generating, based on the first virtual avatar, the target virtual avatar.

In some embodiments, the determination unit is further configured to input the reference virtual avatar and the expression parameter of at least one of the five sense organs into the pre-trained deep neural network to obtain the first virtual avatar that is associated with the attribute of the first avatar and has the expression of the first avatar by: inputting the reference virtual avatar and the expression parameter of at least one of five sense organs into a pre-trained first generative adversarial network to obtain the first virtual avatar that is outputted from the first generative adversarial network, and is associated with the attribute of the first avatar and has the expression of the first avatar.

In some embodiments, the expression parameter of the first avatar further includes a head angle; and the determination unit is further configured to generate, based on the first virtual avatar, the target virtual avatar by: inputting the first virtual avatar and the head angle into a second pre-trained generative adversarial network to obtain the target virtual avatar that is outputted from the second generative adversarial network, and is associated with the attribute of the first avatar and has the expression and head angle of the first avatar.

In some embodiments, the expression parameter of at least one of the five sense organs includes an eye parameter and a mouth parameter; and the acquisition unit is further configured to determine the expression parameter of the first avatar by: detecting expression-related key points of the first avatar to obtain detection results, wherein the expression-related key points include eye key points and mouth key points; and determining, based on the detection results, the eye parameter, the mouth parameter and the head angle of the first avatar.

In some embodiments, the generation unit is further configured to generate the expressionless reference virtual avatar associated with the attribute of the first avatar by: inputting the first avatar into a pre-trained third generative adversarial network to obtain the expressionless reference virtual avatar that is outputted from the third generative adversarial network and associated with the attribute of the first avatar; or detecting the attribute of the first avatar, determining an expressionless virtual avatar associated with the detected attribute based on a preset three-dimensional avatar model, and using the virtual avatar as the expressionless reference virtual avatar associated with the attribute of the first avatar.

In some embodiments, the determination unit is further configured to determine, based on the expression parameter of at least one of the five sense organs, the target virtual avatar that is associated with the attribute of the first avatar and has the expression of the first avatar by: selecting, among preset expression parameters, a preset expression parameter with a smallest difference from the expression parameter of the first avatar; acquiring a preset virtual avatar that is associated with the attribute of the first avatar and has an expression corresponding to the selected preset expression parameter; and generating, based on the preset virtual avatar, the target virtual avatar.

In some embodiments, the expression parameter of the first avatar further includes a head angle; and the determination unit is further configured to determine, based on the preset virtual avatar, the target virtual avatar by: inputting a difference between the expression parameter of the first avatar and the selected preset expression parameter, and the preset virtual avatar into a pre-trained fourth generative adversarial network to obtain the target virtual avatar that is outputted from the fourth generative adversarial network, and is associated with the attribute of the first avatar and has the expression and head angle of the first avatar, wherein a number of parameters of the fourth generative adversarial network is smaller than a number of parameters of the first generative adversarial network and smaller than a number of parameters of the second generative adversarial network.

In some embodiments, the apparatus further includes: a category determination unit, configured to determine an expression category corresponding to the first avatar; and an adding unit, configured to add a special effect corresponding to the expression category to the target virtual avatar.

In some embodiments, the acquiring a first avatar includes: acquiring a to-be-processed avatar; and correcting the to-be-processed avatar to obtain a front avatar of the to-be-processed avatar, and using the front avatar as the first avatar.

In a third aspect, an embodiment of the present disclosure provides an electronic device, the device electronic including: one or more processors; and a storage apparatus for storing one or more programs, where the one or more programs, when executed by the one or more processors, cause the one or more processors to implement any embodiment of the method for generating a virtual avatar.

In a fourth aspect, an embodiment of the present disclosure provides a computer readable storage medium, storing a computer program thereon, where the computer program, when executed by a processor, implements any embodiment of the method for generating a virtual avatar.

BRIEF DESCRIPTION OF THE DRAWINGS

After reading detailed descriptions of non-limiting embodiments with reference to the following accompanying drawings, other features, objectives and advantages of embodiments of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

In the solution of generating a virtual avatar according to embodiments of the present disclosure, first, a first avatar is acquired, and an expression parameter of the first avatar is determined, wherein the expression parameter of the first avatar includes an expression parameter of at least one of five sense organs. Then, based on the expression parameter of at least one of the five sense organs, a target virtual avatar that is associated with an attribute of the first avatar and has an expression of the first avatar is determined. Embodiments of the present disclosure can generate the expression parameter by using the first avatar, thereby efficiently and relatively accurately generating the target virtual avatar corresponding to the attribute and expression of the first avatar based on the expression parameter.

Figure 1:
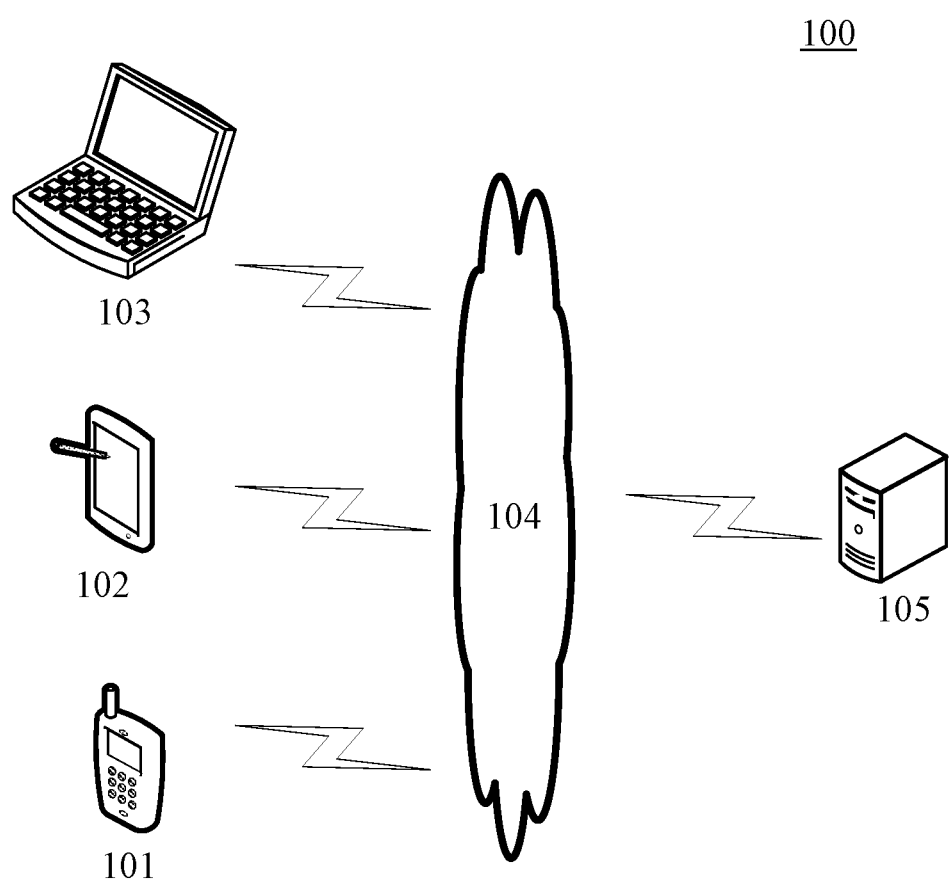
FIG. 1 is a diagram of an example system architecture in which some embodiments of the present disclosure may be implemented.

FIG. 1 shows an example system architecture 100 in which a method for generating a virtual avatar or an apparatus for generating a virtual avatar according to embodiments of the present disclosure can be implemented.

As shown in FIG. 1, the system architecture 100 may include terminal devices 101, 102, and 103, a network 104, and a server 105. The network 104 serves as a medium providing communication links between the terminal devices 101, 102, and 103 and the server 105. The network 104 may include various types of connections, such as wired or wireless communication links, or optical fiber cables.

A user may use the terminal devices 101, 102, and 103 to interact with the server 105 through the network 104 to receive or send messages or the like. The terminal devices 101, 102, and 103 may be installed with various communication client applications, such as virtual avatar generation applications, video applications, live broadcast applications, instant messaging tools, E-mail clients, and social platform software.

The terminal devices 101, 102, and 103 here may be hardware or software. When the terminal devices 101, 102, and 103 are hardware, the terminal devices 101, 102, and 103 may be various electronic devices with display screens, including but not limited to a smart phone, a tablet computer, an e-book reader, a laptop portable computer, a desktop computer, or the like. When the terminal devices 101, 102, and 103 are software, the terminal devices 101, 102, and 103 may be installed in the above-listed electronic devices. The terminal devices 101, 102, and 103 may be implemented as a plurality of software programs or software modules (for example, a plurality of software programs or software modules used to provide distributed services), or as a single software program or software module. Specific limitations are not given here.

The server 105 may be a server providing various services, for example, a backend server providing supports for the terminal devices 101, 102, and 103. The backend server may process, such as analyze, data such as a first avatar, and feed back a processing result (for example, a first virtual avatar) to the terminal device.

It should be noted that the method for generating a virtual avatar according to embodiments of the present disclosure may be executed by the server 105 or the terminal devices 101, 102, and 103, and accordingly, the apparatus for generating a virtual avatar may be provided in the server 105 or the terminal device 101, 102, or 103.

It should be understood that the numbers of the terminal devices, the network, and the server in FIG. 1 are merely illustrative. Any number of terminal devices, networks and servers may be provided according to actual requirements.

Figure 2:
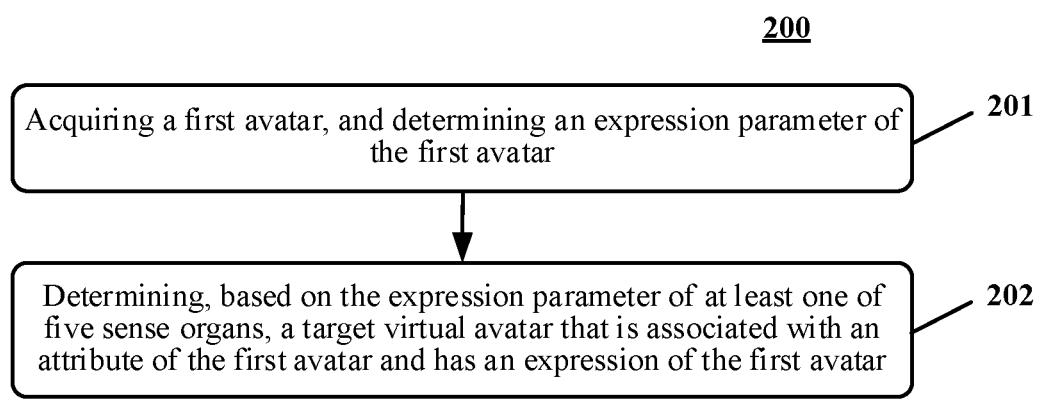
FIG. 2 is a flowchart of a method for generating a virtual avatar according to an embodiment of the present disclosure.

Continuing to refer to FIG. 2, a flow 200 of a method for generating a virtual avatar according to an embodiment of the present disclosure is shown. The method for generating a virtual avatar includes the following steps.

Step 201: acquiring a first avatar, and determining an expression parameter of the first avatar, the expression parameter of the first avatar including an expression parameter of at least one of five sense organs.

In this embodiment, the executing body (for example, the server or terminal device shown in FIG. 1) of the method for generating a virtual avatar may acquire the first avatar. The avatar here may include not only the face, but also the neck, shoulders, and the like. In addition, the executing body may determine the expression parameter of the first avatar. The expression parameter is a parameter, reflecting an expression, of the first avatar. Specifically, the expression parameter may include an expression parameter of at least one of five sense organs, for example, an eyebrow (two eyebrows) parameter, an eye (two eyes) parameter, and/or a mouth parameter. Specifically, each of the expression parameters may be within a corresponding preset value range, such as a range of 0 to 1. The eyebrow parameter may indicate an offset of eyebrows. For example, the eyebrow parameter is 0.5 when the eyebrows are at original positions, the eyebrow parameter in an avatar with raised eyebrows is 0.75, and the eyebrow parameter in an avatar with lowered eyebrows is 0.3. The eye parameter may indicate the degree of opening and closing of eyes. For example, the eye parameter in an avatar with wide eyes is 0.8, and the eye parameter in an avatar with narrow eyes is 0.15. The mouth parameter may represent a shape of the mouth in the image, which may be a classification result, for example, the category includes pouting mouth, open mouth, closed mouth, slightly closed mouth, leftward curled mouth, rightward curled mouth, and the like. In addition, the mouth parameter may also be a value indicating the degree of opening of the mouth. For example, the mouth parameter in an avatar with an open mouth is 0.8, and the mouth parameter in an avatar with a closed mouth is 0.2.

In practice, the executing body may determine the expression parameter corresponding to the first avatar by using a preset model or a preset corresponding relationship table. The preset model and the preset corresponding relationship table here may be used to represent the corresponding relationship between the avatar and the expression parameter of the avatar.

In some optional implementations of this embodiment, the acquiring a first avatar in step 201 may include: acquiring a to-be-processed avatar; and correcting the to-be-processed avatar to obtain a front avatar of the to-be-processed avatar, and using the front avatar as the first avatar.

In these optional implementations, the executing body may acquire a single to-be-processed avatar locally or from other electronic devices. The executing body may align and correct the to-be-processed avatar, thereby converting the to-be-processed avatar into the front avatar, that is, a front facial avatar. The executing body may use the front avatar as the first avatar, thereby generating a front first virtual avatar.

In these implementations, the front virtual avatar can be generated only by means of a single avatar instead of a large number of avatars.

Step 202: determining, based on the expression parameter of at least one of the five sense organs, a target virtual avatar that is associated with an attribute of the first avatar and has an expression of the first avatar.

In this embodiment, the executing body may determine the target virtual avatar based on the expression parameter of at least one of the five sense organs. The target virtual avatar may be a two-dimensional image, and in some cases, the target virtual avatar may also be a three-dimensional image. Specifically, the target virtual avatar is not only associated with the attribute of the first avatar, but also has the expression of the first avatar.

Specifically, the attribute refers to a property that reflects the characteristic of the first avatar and does not change due to the change of the expression. For example, the attribute may include at least one of the following: face shape, fat or thin face, hairstyle, size and/or shape of at least one of the five sense organs, and color of each part of the avatar. The association between the virtual avatar and the attribute of first avatar may indicate that attributes (or part of the attributes) of the generated virtual avatar are exactly the same as or similar to (the similarity is greater than a preset threshold) the attributes (or part of the attributes) of the first avatar, and may also indicate that the attributes (or part of the attributes) of the virtual avatar are not similar to the attributes (or part of the attributes) of the first avatar but the virtual avatar and the first avatar have a corresponding relationship in shape and/or size. For example, the width of the nose of the first avatar is 2 cm, and the width of the nose of the associated virtual avatar is 1 cm; or the width of the nose of the first avatar is 1.5 cm, and the width of the nose of the associated virtual avatar is 0.75 cm.

In practice, the executing body may determine the target virtual avatar by various means based on the expression parameter of at least one of the five sense organs. For example, the executing body may use a preset model to input the first avatar and the expression parameter of at least one of the five sense organs into the model, so as to obtain the target virtual avatar outputted by the model. The model may be used to represent the corresponding relationship between both of the first avatar and the expression parameter and the target virtual avatar.

The method according to the above embodiment of the present disclosure can generate the expression parameter by using the first avatar, thereby efficiently and relatively accurately generating the target virtual avatar corresponding to the attribute and expression of the first avatar based on the expression parameter.

In some optional implementations of this embodiment, the method may further include: determining an expression category corresponding to the first avatar; and adding a special effect corresponding to the expression category to the target virtual avatar.

In these optional implementations, the executing body can not only determine the expression parameter of the first avatar, but also can determine the expression category corresponding to the first avatar. Different expression categories may correspond to different special effects. For example, a crying expression category may correspond to a special effect of tears, and a winking expression category may correspond to a special effect of adding hearts or five-pointed stars to the corners of eyes.

In practice, the executing body may determine the expression category by various means. For example, the executing body may input the avatar into a specified model, thereby obtaining the expression category outputted from the specified model. The specified model here may be used to represent the corresponding relationship between the avatar and the expression category. In addition, the executing body may further detect key points in the first avatar, such as expression-related key points, and obtain the expression category by using the corresponding relationship (such as a function, a model, or a corresponding relationship table) between the coordinates of the key points and the expression category.

These implementations can determine the expression category, and then the special effect is added to the target virtual avatar, so that the virtual avatar is more vivid and the interest of the virtual avatar is increased.

In some optional implementations of this embodiment, step 202 may include: selecting, among preset expression parameters, a preset expression parameter with a smallest difference from the expression parameter of the first avatar; acquiring a preset virtual avatar that is associated with the attribute of the first avatar and has an expression corresponding to the selected preset expression parameter; and generating, based on the preset virtual avatar, the target virtual avatar.

In these optional implementations, the executing body may acquire a user's avatar in advance, and determine the target virtual avatar having the expression with the preset expression parameter as the preset virtual avatar. In practice, the number of the preset expression parameters may be more than two, and accordingly, the executing body may determine a plurality of preset virtual avatars. After that, if the executing body acquires the first avatar of the same person (that is, the preset virtual avatar and the first avatar are avatars of the same person), the executing body may determine the expression parameter of the first avatar, and select the preset expression parameter with the smallest difference from the expression parameter of the first avatar. Then, the executing body may acquire a preset virtual avatar corresponding to the preset expression parameter, and generate the target virtual avatar based on the acquired preset virtual avatar.

In practice, the executing body may generate the target virtual avatar by various means. For example, the executing body may directly determine the acquired preset virtual avatar as the target virtual avatar.

In these implementations, the executing body or other electronic device may generate the preset virtual avatar for the user in advance. In this way, if a user's virtual avatar needs to be generated later, the preset virtual avatar can be directly used, so that the virtual avatar of the current user avatar can be quickly and accurately obtained.

In some optional application scenarios of these implementations, the expression parameter of the first avatar further includes a head angle. In these implementations, determining, based on the preset virtual avatar, the target virtual avatar may include: inputting a difference between the expression parameter of the first avatar and the selected preset expression parameter, and the preset virtual avatar into a pre-trained fourth generative adversarial network to obtain the target virtual avatar that is outputted from the fourth generative adversarial network, and is associated with the attribute of the first avatar and has the expression and head angle of the first avatar. The number of parameters of the fourth generative adversarial network is smaller than the number of parameters of a first generative adversarial network and smaller than the number of parameters of a second generative adversarial network.

In these optional application scenarios, the executing body may input the difference between the expression parameter of the first avatar and the selected preset expression parameter, and the acquired preset virtual avatar into the fourth generative adversarial network to obtain the target virtual avatar that is outputted from the net and has the expression and head angle of the first avatar. The fourth generative adversarial network may be used to adjust the posture of the organ (at least one of the five sense organs) of the virtual avatar and the head angle by using the difference between the inputted expression parameters, and specifically, may be used to represent the corresponding relationship between the following input and output: the input includes the difference between the expression parameter of the first avatar and the preset expression parameter, and the target virtual avatar with the expression corresponding to the preset expression parameter, and the output includes the target virtual avatar that is associated with the attribute of the first avatar and has the expression and head angle of the first avatar. In practice, the fourth generative adversarial network here may be a conditional generative adversarial network.

In these implementations, the executing body or other electronic device may generate the preset virtual avatar for the user in advance. In this way, if a user's virtual avatar needs to be generated later, the preset virtual avatar can be modified by the fourth generative adversarial network with fewer parameters and fast calculation speed, thereby quickly and accurately obtaining the virtual avatar of the current user avatar.

Figure 3:
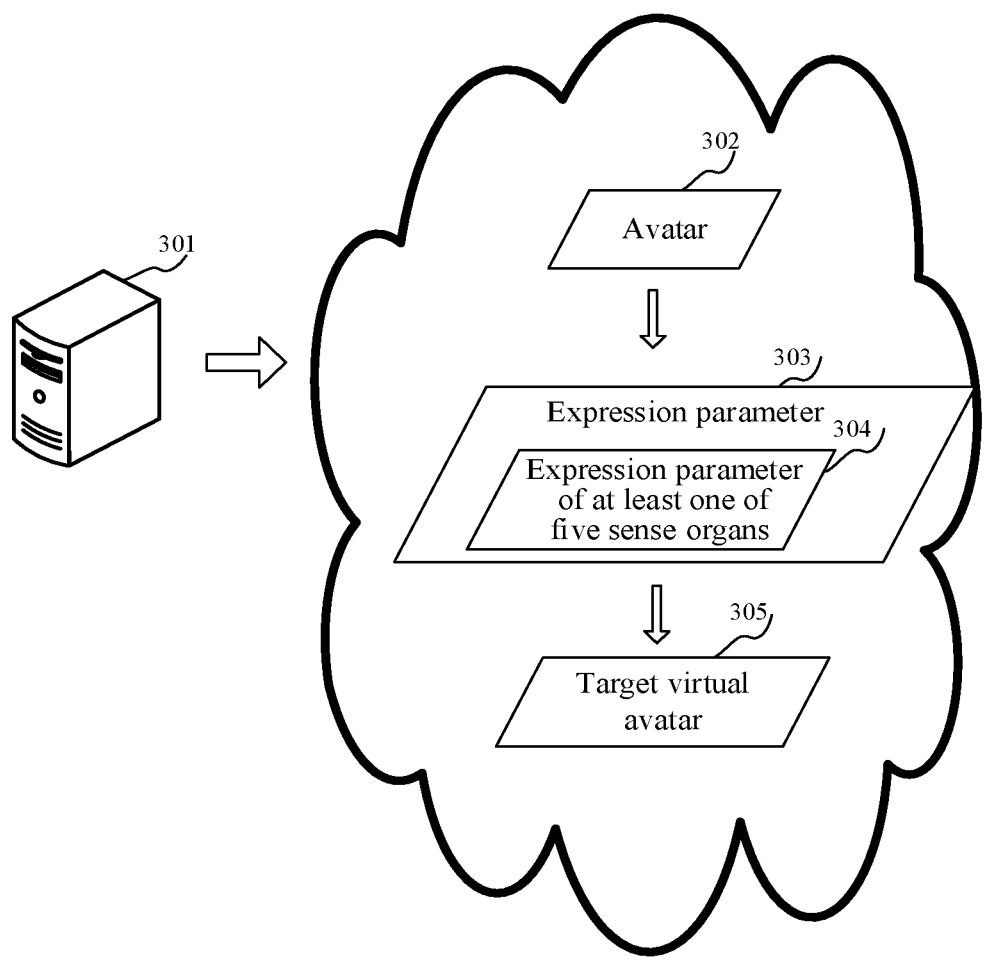
FIG. 3 is a schematic diagram of an application scenario of the method for generating a virtual avatar according to an embodiment of the present disclosure.

Continue to refer to FIG. 3, which is a schematic diagram of an application scenario of the method for generating a virtual avatar according to this embodiment. In the application scenario of FIG. 3, the executing body 301 may acquire an avatar 302 of Zhang San and determine an expression parameter 303 of the avatar 302, where the expression parameter 303 includes an expression parameter 304 of at least one of five sense organs; and based on the expression parameter 304 of at least one of the five sense organs, the executing body 301 determines a target virtual avatar 305 that is associated with an attribute of the avatar 302 and has an expression of the avatar 302.

Figure 4:
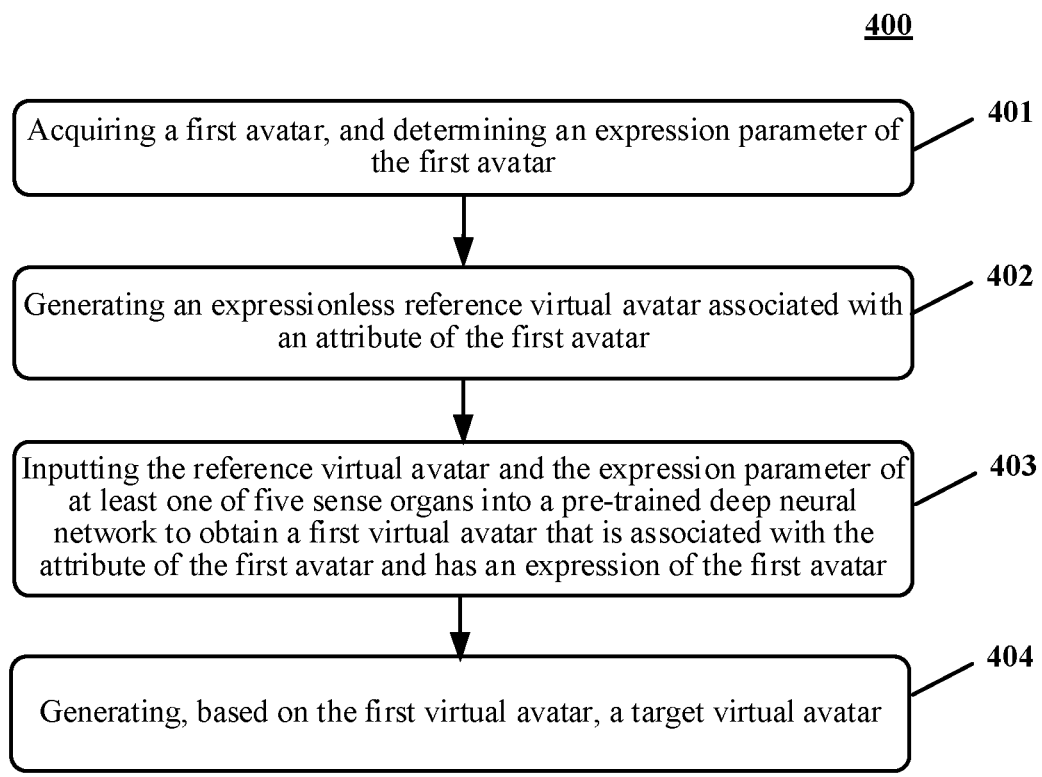
FIG. 4 is a flowchart of the method for generating a virtual avatar according to another embodiment of the present disclosure.

With further reference to FIG. 4, a flow 400 of another embodiment of the method for generating a virtual avatar is shown. The flow 400 of the method for generating a virtual avatar includes the following steps.

Step 401: acquiring a first avatar, and determining an expression parameter of the first avatar, the expression parameter of the first avatar including an expression parameter of at least one of five sense organs.

In this embodiment, the executing body (for example, the server or terminal device shown in FIG. 1) of the method for generating a virtual avatar may acquire the first avatar. The avatar here may include not only the face, but also the neck, shoulders, and the like. In addition, the executing body may determine the expression parameter of the first avatar. The expression parameter is a parameter, reflecting an expression, of the first avatar.

Step 402: generating an expressionless reference virtual avatar associated with an attribute of the first avatar.

In this embodiment, the executing body may also generate an expressionless virtual avatar associated with the attribute of the first avatar as the reference virtual avatar. When the reference virtual avatar is generated, an avatar similar to the first avatar is obtained. The reference virtual avatar here may be a virtual two-dimensional avatar or a virtual three-dimensional avatar. The angle of the first avatar may be different from the angle of a front avatar within a preset angle range.

In practice, the executing body may generate the reference virtual avatar by various means. For example, the executing body may acquire a pre-trained convolutional neural network, where the convolutional neural network may be used to represent the corresponding relationship between an avatar and an expressionless virtual avatar associated with the attribute of the avatar. After that, the executing body may input the first avatar into the convolutional neural network to obtain a virtual avatar outputted from the convolutional neural network. In this way, the executing body may use the outputted virtual avatar as the reference virtual avatar.

In some optional implementations of this embodiment, step 402 may include: inputting the first avatar into a pre-trained third generative adversarial network to obtain the expressionless reference virtual avatar that is outputted from the third generative adversarial network and associated with the attribute of the first avatar; or detecting the attribute of the first avatar, determining an expressionless virtual avatar associated with the detected attribute based on a preset three-dimensional avatar model, and using the virtual avatar as the expressionless reference virtual avatar associated with the attribute of the first avatar.

In these optional implementations, the executing body may input the first avatar into the pre-trained third generative adversarial network, to obtain the virtual avatar outputted from the third generative adversarial network as the reference virtual avatar. Specifically, the third generative adversarial network may be a conditional generative adversarial network. Specifically, the third generative adversarial network may be used to represent the corresponding relationship between an avatar and an expressionless virtual avatar associated with the attribute of the avatar. In practice, the executing body or other electronic device may acquire a plurality of real-person avatars as an input, and use reference virtual avatars corresponding to these real-person avatars as a target output to train a to-be-trained third generative adversarial network, so as to obtain the above-mentioned third generative adversarial network.

In practice, the executing body may also determine the reference virtual avatar by pinching the face. The specific steps may be as follows.

First, the executing body may determine the face shape, hairstyle, and local colors of the first avatar through a preset model or by detecting key points and determining the positional relationship between the key points. Specifically, the executing body may acquire preset various face shapes, various hairstyles, and various colors in advance, and then determine a preset face shape and a preset hairstyle to which the first avatar belongs, and a preset color of each part. In addition, the executing body may acquire shapes of the five sense organs (such as eyes, nose and/or mouth) preset for each preset face shape. Then, through the preset model or by detecting key points and determining the positional relationship between the key points, the executing body may determine a value within a numerical range of fat and thin faces, and determine a size value of the eyes, a size value of the nose, and a size value of the mouth within a numerical range of the size of the eyes, a numerical range of the size of the nose, and a numerical range of the size of the mouth, respectively. The numerical ranges may be set arbitrarily, such as 0 to 1. For example, in a fatter avatar, the value of the fat face may be 0.7, and in a thinner avatar, the value of the thin face may be 0.45.

In this way, the executing body obtains the attribute of the first avatar, that is, a preset face shape to which the first avatar belongs, a preset hairstyle to which the first avatar belongs, a preset color of each part, the value of the fat or thin face, and the size value of at least one of the five sense organs. The executing body may add the obtained attributes to the preset three-dimensional avatar model to obtain the virtual avatar associated with the attribute of the first avatar as the reference virtual avatar, thereby realizing face pinching.

These implementations can efficiently and accurately obtain a virtual avatar by using the generative adversarial network, and can also obtain an accurate reference virtual avatar by pinching the face.

Step 403: inputting the reference virtual avatar and the expression parameter of at least one of five sense organs into a pre-trained deep neural network to obtain a first virtual avatar that is associated with the attribute of the first avatar and has an expression of the first avatar.

In this embodiment, the executing body may input the generated reference virtual avatar and one or more of the above-mentioned expression parameters into the pre-trained deep neural network, thereby obtaining the first virtual avatar outputted from the model. In practice, the first virtual avatar may be a two-dimensional image or a three-dimensional image. Specifically, the first virtual avatar is not only associated with the attribute of the first avatar, but also has the expression of the first avatar. In practice, the deep neural network may be various, such as a convolutional neural network. The deep neural network here may be used to add the expression to the reference virtual avatar, and specifically, may be used to represent the corresponding relationship between both of the reference virtual avatar and the expression parameter and the first virtual avatar having the expression corresponding to the expression parameter.

In some optional implementations of this embodiment, step 403 may include: inputting the reference virtual avatar and the expression parameter of at least one of five sense organs into a pre-trained first generative adversarial network to obtain the first virtual avatar that is outputted from the first generative adversarial network, and is associated with the attribute of the first avatar and has the expression of the first avatar.

In these optional implementations, the deep neural network may be a generative adversarial network, such as a conditional generative adversarial network. The executing body may add the expression corresponding to the inputted expression parameter to the inputted reference virtual avatar by using the generative adversarial network, that is, the first generative adversarial network.

These implementations can generate a more accurate first virtual avatar with the expression of the first avatar by using the generative adversarial network.

Step 404: generating, based on the first virtual avatar, a target virtual avatar.

In this embodiment, the executing body may generate, based on the first virtual avatar, the target virtual avatar by various means. For example, the executing body may directly use the first virtual avatar as the target virtual avatar.

The method according to the above embodiment of the present disclosure can generate an expressionless reference virtual avatar and an expression parameter by using the first avatar, thereby further improving, based on the generated expressionless reference virtual avatar and the expression parameter and the deep neural network, the efficiency and accuracy of generating the first virtual avatar corresponding to the attribute and expression of the first avatar.

In some optional implementations of this embodiment, the expression parameter of the first avatar further includes a head angle; and the step 404 may include: inputting the first virtual avatar and the head angle into a second pre-trained generative adversarial network to obtain the target virtual avatar that is outputted from the second generative adversarial network, and is associated with the attribute of the first avatar and has the expression and head angle of the first avatar.

In these optional implementations, the executing body may input the first virtual avatar and the head angle in the first avatar into the second generative adversarial network to obtain the target virtual avatar outputted from the second generative adversarial network. Specifically, the target virtual avatar is not only associated with the attribute of the first avatar, but also has the expression and head angle of the first avatar. Specifically, the second generative adversarial network may also be a conditional generative adversarial network, which can add the head angle to the virtual avatar, and specifically can be used to represent the corresponding relationship between both of the first virtual avatar and the head angle and the target virtual avatar with the head angle.

In practice, the expression parameter may include not only the expression parameter of at least one of the five sense organs, but also a head angle. Specifically, the head angle may refer to an angle of the head relative to a camera that shoots the first avatar, or a deviation angle of the current head from its front angle. Specifically, the head angle may be denoted by a rotation angle of three coordinate axes of x, y, and z.

These implementations can add the head angle to the virtual avatar, so that the virtual avatar not only corresponds to the attribute of a person and has the expression of the person, but also has the head posture of the person, and a more vivid avatar can be presented.

Figure 5:
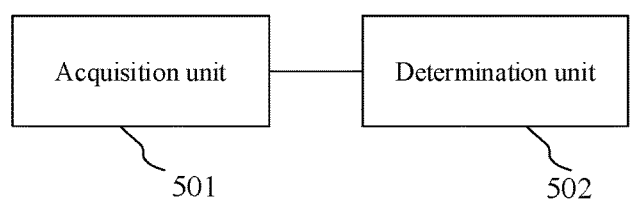
FIG. 5 is a schematic structural diagram of an apparatus for generating a virtual avatar according to an embodiment of the present disclosure.

Further referring to FIG. 5, as an implementation of the methods shown in the above figures, an embodiment of the present disclosure provides an apparatus for generating a virtual avatar. An embodiment of the apparatus corresponds to the embodiment of the method shown in FIG. 2. In addition to the features described below, the embodiment of the apparatus may also include the same or corresponding features or effects as the embodiment of the method shown in FIG. 2. The apparatus can be applied to various electronic devices for generating a virtual avatar.

As shown in FIG. 5, the apparatus 500 for generating a virtual avatar in this embodiment includes: an acquisition unit 501 and a determination unit 502. The acquisition unit 501 is configured to acquire a first avatar, and determine an expression parameter of the first avatar, wherein the expression parameter of the first avatar includes an expression parameter of at least one of five sense organs; and the determination unit 502 is configured to determine, based on the expression parameter of at least one of the five sense organs, a target virtual avatar that is associated with an attribute of the first avatar and has an expression of the first avatar.

In this embodiment, the specific processing of the acquisition unit 501 and the determination unit 502 of the apparatus 500 for generating a virtual avatar and the technical effects brought accordingly can be referred to the relevant descriptions of step 201 and step 202 in the embodiment corresponding to FIG. 2, and details are not described herein again.

In some optional implementations of this embodiment, the apparatus further includes: a generation unit, configured to generate an expressionless reference virtual avatar associated with the attribute of the first avatar; and the determination unit is further configured to determine, based on the expression parameter of at least one of the five sense organs, the target virtual avatar that is associated with the attribute of the first avatar and has the expression of the first avatar by: inputting the reference virtual avatar and the expression parameter of at least one of the five sense organs into a pre-trained deep neural network to obtain a first virtual avatar that is associated with the attribute of the first avatar and has the expression of the first avatar; and generating, based on the first virtual avatar, the target virtual avatar.

In some optional implementations of this embodiment, the determination unit is further configured to input the reference virtual avatar and the expression parameter of at least one of the five sense organs into the pre-trained deep neural network to obtain the first virtual avatar that is associated with the attribute of the first avatar and has the expression of the first avatar by: inputting the reference virtual avatar and the expression parameter of at least one of five sense organs into a pre-trained first generative adversarial network to obtain the first virtual avatar that is outputted from the first generative adversarial network, and is associated with the attribute of the first avatar and has the expression of the first avatar.

In some optional implementations of this embodiment, the expression parameter of the first avatar further includes a head angle; and the determination unit is further configured to generate, based on the first virtual avatar, the target virtual avatar by: inputting the first virtual avatar and the head angle into a pre-trained second generative adversarial network to obtain the target virtual avatar that is outputted from the second generative adversarial network, and is associated with the attribute of the first avatar and has the expression and head angle of the first avatar.

In some optional implementations of this embodiment, the expression parameter of at least one of the five sense organs includes an eye parameter and a mouth parameter; and the acquisition unit is further configured to determine the expression parameter of the first avatar by: detecting expression-related key points of the first avatar to obtain detection results, wherein the expression-related key points include eye key points and mouth key points; and determining, based on the detection results, the eye parameter, the mouth parameter and the head angle of the first avatar.

In some optional implementations of this embodiment, the generation unit is further configured to generate the expressionless reference virtual avatar associated with the attribute of the first avatar by: inputting the first avatar into a pre-trained third generative adversarial network to obtain the expressionless reference virtual avatar that is outputted from the third generative adversarial network and associated with the attribute of the first avatar; or detecting the attribute of the first avatar, determining an expressionless virtual avatar associated with the detected attribute based on a preset three-dimensional avatar model, and using the virtual avatar as the expressionless reference virtual avatar associated with the attribute of the first avatar.

In some optional implementations of this embodiment, the determination unit is further configured to determine, based on the expression parameter of at least one of the five sense organs, the target virtual avatar that is associated with the attribute of the first avatar and has the expression of the first avatar by: selecting, among preset expression parameters, a preset expression parameter with a smallest difference from the expression parameter of the first avatar; acquiring a preset virtual avatar that is associated with the attribute of the first avatar and has an expression corresponding to the selected preset expression parameter; and generating, based on the preset virtual avatar, the target virtual avatar.

In some optional implementations of this embodiment, the expression parameter of the first avatar further includes a head angle; and the determination unit is further configured to determine, based on the preset virtual avatar, the target virtual avatar by: inputting a difference between the expression parameter of the first avatar and the selected preset expression parameter, and the preset virtual avatar into a pre-trained fourth generative adversarial network to obtain the target virtual avatar that is outputted from the fourth generative adversarial network, and is associated with the attribute of the first avatar and has the expression and head angle of the first avatar, where a number of parameters of the fourth generative adversarial network is smaller than a number of parameters of the first generative adversarial network and smaller than a number of parameters of the second generative adversarial network.

In some optional implementations of this embodiment, the apparatus further includes: a category determination unit, configured to determine an expression category corresponding to the first avatar; and an adding unit, configured to add a special effect corresponding to the expression category to the target virtual avatar.

In some optional implementations of this embodiment, acquiring a first avatar includes: acquiring a to-be-processed avatar; and correcting the to-be-processed avatar to obtain a front avatar of the to-be-processed avatar, and using the front avatar as the first avatar.

Figure 6:
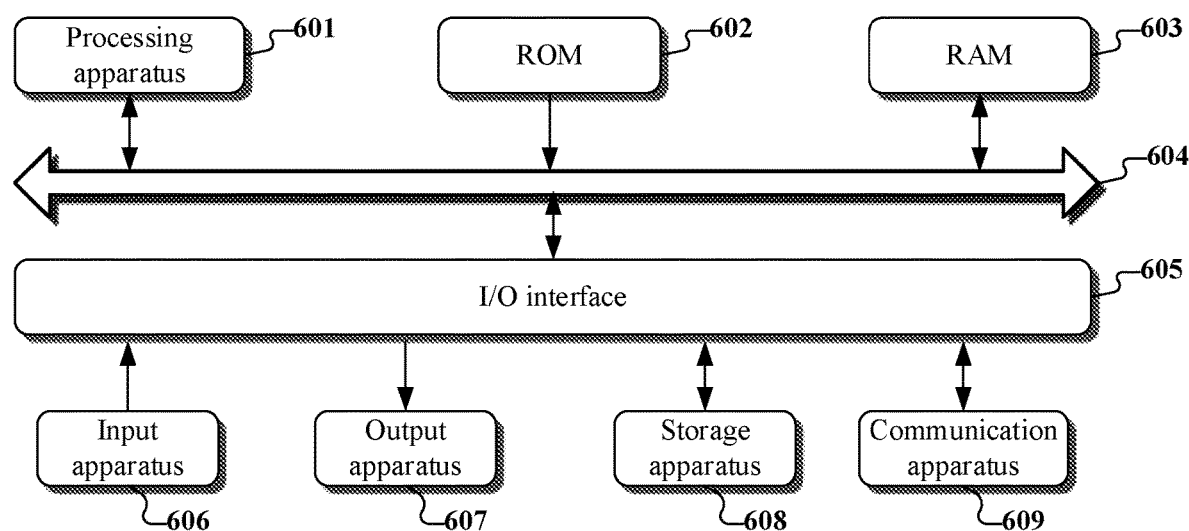
FIG. 6 is a schematic structural diagram of a computer system adapted to implement an electronic device according to some embodiments of the present disclosure.

As shown in FIG. 6, the electronic device 600 may include a processing apparatus (for example, a central processing unit, a graphics processing unit, and the like) 601, which may execute various appropriate operations and processes according to a program stored in a read-only memory (ROM) 602 or a program loaded into a random access memory (RAM) 603 from a storage apparatus 608. The RAM 603 also stores various programs and data required by the operations of the electronic device 600. The processing apparatus 601, the ROM 602, and the RAM 603 are connected to each other through a bus 604. An input/output (I/O) interface 605 is also connected to the bus 604.

Generally, the following apparatuses may be connected to the I/O interface 605: an input apparatus 606 including, for example, a touch screen, a touch pad, a keyboard, a mouse, a camera, a microphone, an accelerometer, a gyroscope, and the like; an output apparatus 607 including, for example, a liquid crystal display (LCD), a speaker, a vibrator, and the like; a storage apparatus 608 including, for example, a magnetic tape, a hard disk, and the like; and a communication apparatus 609. The communication apparatus 609 may allow wireless or wired communication between the electronic device 600 and other device to exchange data. Although FIG. 6 illustrates the electronic device 600 having various apparatuses, it should be understood that all the illustrated apparatuses are not required to be implemented or included. More or less apparatuses may be alternatively implemented or included. Each block shown in FIG. 6 may represent an apparatus or a plurality of apparatuses as required.

In particular, according to embodiments of the present disclosure, the process described above with reference to the flowchart may be implemented as a computer software program. For example, an embodiment of the present disclosure includes a computer program product including a computer program loaded to a non-transitory computer readable medium, the computer program including a program code for executing the method shown in the flowchart. In such an embodiment, the computer program may be downloaded and installed from a network via the communication apparatus 609, or installed from the storage apparatus 608, or installed from the ROM 602. The computer program, when executed by the processing apparatus 601, implements the above functions defined in the method of embodiments of the present disclosure. It should be noted that the non-transitory computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as apart of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in embodiments of the present disclosure may be implemented by means of software or hardware. The described units may also be configured in a processor, for example, it may be described as: a processor includes an acquisition unit and a determination unit. The names of these units do not constitute limitations on the units themselves under certain circumstances. For example, the acquisition unit may also be described as "a unit for acquiring a first avatar and determining an expression parameter of the first avatar."

As another aspect, an embodiment of the present disclosure further provides a computer readable medium. The computer readable medium may be included in the apparatus described in the foregoing embodiment; or the computer readable medium may exist alone, and is not assembled into the apparatus. The computer readable medium carries one or more programs, and when the one or more programs are executed by the apparatus, the apparatus is caused to: acquire a first avatar, and determine an expression parameter of the first avatar, where the expression parameter of the first avatar including an expression parameter of at least one of five sense organs; and determine, based on the expression parameter of at least one of the five sense organs, a target virtual avatar that is associated with an attribute of the first avatar and has an expression of the first avatar.

The above description only provides an explanation of embodiments of the present disclosure and the technical principles used. It should be appreciated by those skilled in the art that the inventive scope of embodiments of the present disclosure is not limited to the technical solutions formed by the particular combinations of the above-described technical features. The inventive scope should also cover other technical solutions formed by any combinations of the above-described technical features or equivalent features thereof without departing from the concept of embodiments of the present disclosure. Technical schemes formed by the above-described features being interchanged with, but not limited to, technical features with similar functions disclosed in embodiments of the present disclosure are examples.

What is claimed is:

1. A method for generating a virtual avatar, the method comprising:
   acquiring a first avatar, and determining an expression parameter of the first avatar, the expression parameter of the first avatar comprising an expression parameter of at least one of five sense organs; and
   determining, based on the expression parameter of at least one of the five sense organs, a target virtual avatar that is associated with an attribute of the first avatar and has an expression of the first avatar; and generating an expressionless reference virtual avatar associated with the attribute of the first avatar, wherein the determining, based on the expression parameter of at least one of the five sense organs, the target virtual avatar that is associated with the attribute of the first avatar and has the expression of the first avatar comprises:

inputting the expressionless reference virtual avatar and the expression parameter of at least one of the five sense organs into a pre-trained deep neural network to obtain a first virtual avatar that is associated with the attribute of the first avatar and has the expression of the first avatar; and generating, based on the first virtual avatar, the target virtual avatar, wherein the expression parameter of the first avatar further comprises a head angle, and wherein the generating, based on the first virtual avatar, the target virtual avatar comprises:

inputting the first virtual avatar and the head angle into a pre-trained generative adversarial network to obtain the target virtual avatar that is outputted from the pre-trained generative adversarial network, and is associated with the attribute of the first avatar and has the expression and head angle of the first avatar.

2. The method according to claim 1, wherein the inputting the expressionless reference virtual avatar and the expression parameter of at least one of the five sense organs into the pre-trained deep neural network to obtain the first virtual avatar that is associated with the attribute of the first avatar and has the expression of the first avatar comprises:

inputting the expressionless reference virtual avatar and the expression parameter of at least one of five sense organs into another pre-trained generative adversarial network to obtain the first virtual avatar that is outputted from the another the pre-trained generative adversarial network, and is associated with the attribute of the first avatar and has the expression of the first avatar.

3. The method according to claim 2, wherein the determining, based on the expression parameter of at least one of the five sense organs, the target virtual avatar that is associated with the attribute of the first avatar and has the expression of the first avatar comprises:

selecting, among preset expression parameters, a preset expression parameter with a smallest difference from the expression parameter of the first avatar;

acquiring a preset virtual avatar that is associated with the attribute of the first avatar and has an expression corresponding to the selected preset expression parameter; and generating, based on the preset virtual avatar, the target virtual avatar.

4. The method according to claim 3, wherein the generating, based on the preset virtual avatar, the target virtual avatar comprises:

inputting a difference between the expression parameter of the first avatar and the selected preset expression parameter, and the preset virtual avatar into a pre-trained fourth generative adversarial network to obtain the target virtual avatar that is outputted from the pre-trained fourth generative adversarial network, and is associated with the attribute of the first avatar and has the expression and the head angle of the first avatar, wherein a number of parameters of the pre-trained fourth generative adversarial network is smaller than a number of parameters of the another pre-trained generative adversarial network and smaller than a number of parameters of a pre-trained second generative adversarial network.

5. The method according to claim 1, wherein the expression parameter of at least one of the five sense organs comprises an eye parameter and a mouth parameter; and the determining the expression parameter of the first avatar comprises:

detecting expression-related key points of the first avatar to obtain detection results, wherein the expression-related key points comprise eye key points and mouth key points; and determining, based on the detection results, the eye parameter, the mouth parameter and the head angle of the first avatar.

6. The method according to claim 1, wherein the generating the expressionless reference virtual avatar associated with the attribute of the first avatar comprises:

inputting the first avatar into a pre-trained third generative adversarial network to obtain the expressionless reference virtual avatar that is outputted from the pre-trained third generative adversarial network and associated with the attribute of the first avatar; or detecting the attribute of the first avatar, determining an expressionless virtual avatar associated with the detected attribute of the first avatar based on a preset three-dimensional avatar model, and using the virtual avatar as the expressionless reference virtual avatar associated with the attribute of the first avatar.

7. The method according to claim 1, wherein the acquiring the first avatar comprises:

acquiring a to-be-processed avatar; and correcting the to-be-processed avatar to obtain a front avatar of the to-be-processed avatar, and using the front avatar as the first avatar.

8. The method according to claim 1, wherein the method further comprises:

determining an expression category corresponding to the first avatar; and adding a special effect corresponding to the expression category to the target virtual avatar.

9. An electronic device, comprising:

one or more processors; and a storage apparatus for storing one or more programs, the one or more programs, when executed by the one or more processors, causing the one or more processors to perform operations comprising:

acquiring a first avatar, and determining an expression parameter of the first avatar, the expression parameter of the first avatar comprising an expression parameter of at least one of five sense organs; and determining, based on the expression parameter of at least one of the five sense organs, a target virtual avatar that is associated with an attribute of the first avatar and has an expression of the first avatar; and generating an expressionless reference virtual avatar associated with the attribute of the first avatar, wherein the determining, based on the expression parameter of at least one of the five sense organs, the target virtual avatar that is associated with the attribute of the first avatar and has the expression of the first avatar comprises:

inputting the expressionless reference virtual avatar and the expression parameter of at least one of the five sense organs into a pre-trained deep neural network to obtain a first virtual avatar that is associated with the attribute of the first avatar and has the expression of the first avatar; and generating, based on the first virtual avatar, the target virtual avatar, wherein the expression parameter of the first avatar further comprises a head angle, and wherein the generating, based on the first virtual avatar, the target virtual avatar comprises:

inputting the first virtual avatar and the head angle into a pre-trained generative adversarial network to obtain the target virtual avatar that is outputted from the pre-trained generative adversarial network, and is associated with the attribute of the first avatar and has the expression and head angle of the first avatar.

10. The electronic device according to claim 9, wherein the inputting the expressionless reference virtual avatar and the expression parameter of at least one of the five sense organs into the pre-trained deep neural network to obtain the first virtual avatar that is associated with the attribute of the first avatar and has the expression of the first avatar comprises:

inputting the expressionless reference virtual avatar and the expression parameter of at least one of five sense organs into another pre-trained generative adversarial network to obtain the first virtual avatar that is outputted from the another pre-trained generative adversarial network, and is associated with the attribute of the first avatar and has the expression of the first avatar.

11. The electronic device according to claim 10, wherein the determining, based on the expression parameter of at least one of the five sense organs, the target virtual avatar that is associated with the attribute of the first avatar and has the expression of the first avatar comprises:

selecting, among preset expression parameters, a preset expression parameter with a smallest difference from the expression parameter of the first avatar;

acquiring a preset virtual avatar that is associated with the attribute of the first avatar and has an expression corresponding to the selected preset expression parameter; and generating, based on the preset virtual avatar, the target virtual avatar.

12. The electronic device according to claim 11, wherein the generating, based on the preset virtual avatar, the target virtual avatar comprises:

inputting a difference between the expression parameter of the first avatar and the selected preset expression parameter, and the preset virtual avatar into a pre-trained fourth generative adversarial network to obtain the target virtual avatar that is outputted from the pre-trained fourth generative adversarial network, and is associated with the attribute of the first avatar and has the expression and the head angle of the first avatar, wherein a number of parameters of the pre-trained fourth generative adversarial network is smaller than a number of parameters of the another pre-trained generative adversarial network and smaller than a number of parameters of a pre-trained second generative adversarial network.

13. The electronic device according to claim 9, wherein the expression parameter of at least one of the five sense organs comprises an eye parameter and a mouth parameter; and the determining the expression parameter of the first avatar comprises:

detecting expression-related key points of the first avatar to obtain detection results, wherein the expression-related key points comprise eye key points and mouth key points; and determining, based on the detection results, the eye parameter, the mouth parameter and the head angle of the first avatar.

14. The electronic device according to claim 9, wherein the generating the expressionless reference virtual avatar associated with the attribute of the first avatar comprises:

inputting the first avatar into a pre-trained third generative adversarial network to obtain the expressionless reference virtual avatar that is outputted from the pre-trained third generative adversarial network and associated with the attribute of the first avatar; or detecting the attribute of the first avatar, determining an expressionless virtual avatar associated with the detected attribute of the first avatar based on a preset three-dimensional avatar model, and using the expressionless virtual avatar as the expressionless reference virtual avatar associated with the attribute of the first avatar.

15. The electronic device according to claim 9, wherein the acquiring the first avatar comprises:

acquiring a to-be-processed avatar; and correcting the to-be-processed avatar to obtain a front avatar of the to-be-processed avatar, and using the front avatar as the first avatar.

16. A non-transitory computer readable storage medium, storing a computer program thereon, the computer program, when executed by a processor, causing the processor to perform operations comprising:

acquiring a first avatar, and determining an expression parameter of the first avatar, the expression parameter of the first avatar comprising an expression parameter of at least one of five sense organs; and determining, based on the expression parameter of at least one of the five sense organs, a target virtual avatar that is associated with an attribute of the first avatar and has an expression of the first avatar; and generating an expressionless reference virtual avatar associated with the attribute of the first avatar, wherein the determining, based on the expression parameter of at least one of the five sense organs, the target virtual avatar that is associated with the attribute of the first avatar and has the expression of the first avatar comprises:

inputting the expressionless reference virtual avatar and the expression parameter of at least one of the five sense organs into a pre-trained deep neural network to obtain a first virtual avatar that is associated with the attribute of the first avatar and has the expression of the first avatar; and generating, based on the first virtual avatar, the target virtual avatar, wherein the expression parameter of the first avatar further comprises a head angle, and wherein the generating, based on the first virtual avatar, the target virtual avatar comprises:

inputting the first virtual avatar and the head angle into a pre-trained generative adversarial network to obtain the target virtual avatar that is outputted from the pre-trained generative adversarial network, and is associated with the attribute of the first avatar and has the expression and head angle of the first avatar.

* * * * *